US009064014B2

(12) United States Patent
Matsuo

(10) Patent No.: US 9,064,014 B2
(45) Date of Patent: Jun. 23, 2015

(54) INFORMATION PROVISIONING DEVICE, INFORMATION PROVISIONING METHOD, PROGRAM, AND INFORMATION RECORDING MEDIUM

(75) Inventor: Keisuke Matsuo, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/817,580

(22) PCT Filed: Aug. 15, 2011

(86) PCT No.: PCT/JP2011/068525
§ 371 (c)(1),
(2), (4) Date: Mar. 25, 2013

(87) PCT Pub. No.: WO2012/023541
PCT Pub. Date: Feb. 23, 2012

(65) Prior Publication Data
US 2013/0185295 A1    Jul. 18, 2013

(30) Foreign Application Priority Data

Aug. 20, 2010 (JP) ................................ 2010-185371

(51) Int. Cl.
*G06F 7/00* (2006.01)
*G06F 17/30* (2006.01)
(Continued)

(52) U.S. Cl.
CPC .......... *G06F 17/30864* (2013.01); *G06Q 30/06* (2013.01); *G06Q 30/02* (2013.01); *G06F 17/30991* (2013.01)

(58) Field of Classification Search
CPC ............... G06Q 30/00; G06Q 30/0256; G06F 17/30522; G06F 17/30011; G06F 17/30477; G06F 17/30672; G06F 17/3097; G06F 17/3044; G06F 17/30964; Y10S 707/99933; Y10S 707/99934
See application file for complete search history.

(56) References Cited

U.S. PATENT DOCUMENTS

2002/0087535 A1* 7/2002 Kotcheff et al. .................. 707/5
2003/0078914 A1* 4/2003 Witbrock ......................... 707/3
(Continued)

FOREIGN PATENT DOCUMENTS

JP      2002-197113 A    7/2002
JP      2007-26456 A     2/2007
(Continued)

OTHER PUBLICATIONS

Tabu search, Glover et al, Handbook of combinatorial optimization, vol. 3, pp. 621-757, 1998.*
(Continued)

*Primary Examiner* — Augustine K Obisesan
(74) *Attorney, Agent, or Firm* — Sughrue Mion, PLLC

(57) ABSTRACT

An information provisioning device (12) presents more appropriate search results to the user while using an existing search function. A storage part (206) stores taboo character strings for identification information of a search target and stores identification information as one of those already searched or already selected by the user in the past. An acquisition part (202) acquires search results consisting of matched information containing identification information of a search target satisfying the query. A correction part (203) corrects the search results in regard to matched information based on whether a taboo character string for the identification information is contained in the query. A presentation part (204) presents the corrected search results to the user. A selection reception part (207) receives a command to select matched information from the user.

10 Claims, 7 Drawing Sheets

(51) Int. Cl.
*G06Q 30/06* (2012.01)
*G06Q 30/02* (2012.01)

(56) References Cited

U.S. PATENT DOCUMENTS

| | | | |
|---|---|---|---|
| 2004/0054661 A1* | 3/2004 | Cheung et al. | 707/3 |
| 2004/0194141 A1* | 9/2004 | Sanders | 725/53 |
| 2004/0205059 A1* | 10/2004 | Nishioka et al. | 707/3 |
| 2005/0065928 A1* | 3/2005 | Mortensen et al. | 707/5 |
| 2005/0154709 A1* | 7/2005 | Barsness et al. | 707/3 |
| 2005/0154716 A1* | 7/2005 | Watson et al. | 707/3 |
| 2006/0004716 A1* | 1/2006 | Hurst-Hiller et al. | 707/3 |
| 2006/0010149 A1* | 1/2006 | Mattern | 707/101 |
| 2006/0020516 A1* | 1/2006 | Choi et al. | 705/26 |
| 2006/0123338 A1* | 6/2006 | McCaffrey et al. | 715/531 |
| 2006/0235824 A1* | 10/2006 | Cheung et al. | 707/1 |
| 2007/0011154 A1* | 1/2007 | Musgrove et al. | 707/5 |
| 2007/0038602 A1* | 2/2007 | Weyand et al. | 707/3 |
| 2007/0050201 A1* | 3/2007 | Gardner et al. | 705/1 |
| 2007/0061331 A1* | 3/2007 | Ramer et al. | 707/10 |
| 2007/0106648 A1* | 5/2007 | Lee et al. | 707/3 |
| 2008/0288454 A1* | 11/2008 | Swadi | 707/3 |
| 2009/0077071 A1* | 3/2009 | Mishkanian et al. | 707/5 |
| 2009/0138506 A1* | 5/2009 | Van Riel | 707/104.1 |
| 2009/0222445 A1* | 9/2009 | Tavor | 707/6 |
| 2009/0234784 A1* | 9/2009 | Buriano et al. | 706/12 |
| 2009/0254568 A1* | 10/2009 | Vignisson et al. | 707/10 |
| 2010/0005424 A1* | 1/2010 | Sundaresan et al. | 715/849 |
| 2010/0082432 A1* | 4/2010 | Feng et al. | 705/14.53 |
| 2010/0153427 A1* | 6/2010 | Schechter et al. | 707/768 |
| 2010/0318555 A1* | 12/2010 | Broder et al. | 707/769 |
| 2011/0082878 A1* | 4/2011 | Nozaki | 707/769 |
| 2012/0143965 A1* | 6/2012 | Parker et al. | 709/206 |

FOREIGN PATENT DOCUMENTS

| | | |
|---|---|---|
| JP | 2008-250663 A | 10/2008 |
| JP | 2009-37420 A | 2/2009 |
| JP | 2010-128928 A | 6/2010 |
| WO | WO 0077689 A1 * | 12/2000 |
| WO | WO 0116807 A1 * | 3/2001 |
| WO | WO 2004010265 A2 * | 1/2004 |
| WO | 2005022319 A2 | 3/2005 |
| WO | 2009029825 A1 | 3/2009 |
| WO | WO 2010144949 A1 * | 12/2010 |

OTHER PUBLICATIONS

International Search Report for PCT/JP2011/068525 dated Nov. 15, 2011.

* cited by examiner

INFORMATION PROVISIONING DEVICE, INFORMATION PROVISIONING METHOD, PROGRAM, AND INFORMATION RECORDING MEDIUM

CROSS REFERENCE TO RELATED APPLICATIONS

This application is a National Stage of International Application No. PCT/JP2011/068525 filed Aug. 15, 2011, claiming priority based on Japanese Patent Application No. 2010-185371 filed Aug. 20, 2010, the contents of all of which are incorporated herein by reference in their entirety.

BACKGROUND OF THE INVENTION

1. Field of the Invention

The present invention relates to an information provisioning device, information provisioning method, program, and information recording medium for presenting more appropriate search results to the user while using an existing search function.

2. Description of Related Art

Various information provisioning systems providing information for easier comparison of products or services the user is interested in have been proposed in the prior art.

The aforementioned information provisioning system generally consists of a terminal device and information provisioning device connected via a network. The network means various computers being connected to each other in a communicable manner and also called a computer communication network. The currently most extensively-used network is the Internet.

Here, the terminal device receives a keyword entered by the user in regard to a product or service the user is interested in.

On the other hand, the information provisioning device retains data such as descriptions and advertising statements explaining details of products and/or services in advance.

The keyword entered into the terminal device is transferred to the information provisioning device via the network. The information provisioning device searches the data prepared in advance using a query containing the transferred keyword.

Upon the search, it is determined whether the query keyword appears in the description or advertising statement of a product or service. Data fulfilling the search condition expressed by the query are acquired based on the determination results.

Then, the information provisioning device transfers to the terminal device the search results in which the acquired data are arranged in the order of degree of matching or in the order of score presenting the significance of the data.

The terminal device displays the search results on the screen to present the products and/or services that match the desire of the user. The search results include snippets presenting descriptions and/or advertising statements or summaries or outlines thereof on the products and/or services.

With the search results being presented from the information provisioning system, the user is urged to take action such as viewing detailed information of, purchasing, and making reservations for a found product or service.

As the information provisioning system presents to the user advertising statements or summaries thereof on the products and/or services, it can be said that the information provisioning system fulfills the advertising function.

Many information provisioning systems impose an upper limit on the number of data or snippets contained in the search results presented to the user at a time so as to reduce the workload of calculation and/or communication and compose an appropriate screen layout for easier composition by the user.

Currently, in most cases, the Internet is used as the network, portable terminals such as cell-phones and smart-phones having the web browser function and PDAs (personal data assistants), and personal computers are used as the terminal device, and server computers realizing the database function for data accumulation and search and the web server function for communication with the web browser are used as the information provisioning device.

By the way, Patent Literature 1 has proposed a technique allowing the user to view the data he/she has searched for in the past on a preferential basis through simple operation among data fulfilling the search condition.

Patent Literature 2 discloses a search technique providing the user with advertisement fitting the attributes of the user. In this search technique, various attributes of products and/or services are given in advance and the user can select and search for a desired attribute as necessary.

PRIOR ART LITERATURE

Patent Literature

Patent Literature 1: Unexamined Japanese Patent Application Kokai Publication No. 2008-250663; and
Patent Literature 2: Unexamined Japanese Patent Application Kokai Publication No. 2007-026456.

DISCLOSURE OF INVENTION

Problems to be Solved by the Invention

Nowadays new products and/or services emerge every day and the trend change rapidly. Descriptions and advertising statements of products and/or services are often created by the product sellers and/or service providers themselves. Therefore, data presented to the users by the information provisioning system in regard to the products and/or services are created by a large number of product sellers and service providers.

Some product sellers and/or service providers may create descriptions and/or advertising statements containing inappropriate language in attempting to increase the chance of their own products or services being presented.

In such a case, inappropriate descriptions and/or advertising statements may appear at or near the top of the search results. Then, the credibility of the entire information provisioning system may be impaired because of inappropriate language contained in the data at or near the top of the displayed search results.

Therefore, there is a demand for a technique for controlling the display of data regarding a product or service in the search results if the description and/or advertising statement of the product or service contains inappropriate language.

The present invention is intended to solve the above problem and an exemplary object of the present invention is to provide an information provisioning device, information provisioning method, program, and information recording medium suitable for presenting more appropriate search results to the user while using an existing search function.

BRIEF SUMMARY OF THE INVENTION

The information provisioning device according to a first exemplary aspect of the present invention comprises:

a query reception part receiving input of a query;

a storage storing taboo character strings and associated identification information of search targets;

an acquisition part acquiring search results consisting of matched information and the associated identification information satisfying the query among the search targets;

a correction part correcting the search results when matched information contained in the search results satisfies a given condition;

a presentation part presenting the matched information contained in the corrected search results; and a selection reception part receiving a selection command on the presented matched information, wherein the storage stores identification information contained in the matched information constituting the acquired search results as identification information associated with content already searched, and identification information contained in the matched information selected with the selection command as identification information associated with content already selected; and the given condition is satisfied when a taboo character string is stored in the storage in association with identification information contained in the matched information and the stored taboo character string is contained in the query.

Furthermore, it is possible in the information provisioning device of the present invention that:

the given condition is further satisfied when identification information contained in the matched information is stored in the storage as one of those already searched, and the identification information contained in the matched information is not stored in the storage as one of those already selected.

Furthermore, it is possible in the information provisioning device of the present invention that:

the acquisition part makes an external information search device search for a search target based on the query and acquires the search results.

Furthermore, it is possible that the information provisioning device of the present invention comprises:

a search part searching for a search target based on the query, wherein the acquisition part acquires the search results found by the search part.

Furthermore, it is possible in the information provisioning device of the present invention that:

the matched information further contains the rank of the found search target; and the correction part corrects the search results by changing the rank of matched information contained in the search results based on whether the given condition is satisfied.

Furthermore, it is possible in the information provisioning device of the present invention that:

the correction part corrects the search results by narrowing down matched information contained in the search results based on whether the given condition is satisfied.

Furthermore, it is possible in the information provisioning device of the present invention that:

the storage further stores, for each user, queries that result in storing the identification information as one of those already searched or already selected; and for each query and identification information, the character string of the query is stored in the storage as a taboo character string for the identification information when the number of users for whom the identification information is stored in the storage as one of those already searched due to the query and the number of users for whom the identification information is stored in the storage as one of those already selected due to the query satisfy a given set condition.

Furthermore, it is possible in the information provisioning device of the present invention that:

the matched information further contains a snippet of the search target; and the correction part further corrects the search results in regard to each piece of matched information contained in the search results based on the character string obtained by removing the character string contained in the query from the character string of the snippet contained in the matched information.

The information provisioning method according to a second exemplary aspect of the present invention is executed by an information provisioning device comprising a query reception part, a storage part, an acquisition part, a correction part, a presentation part, and a selection reception part, wherein:

the storage part stores taboo character strings associated with identification information of search targets; and the method comprises:

a query reception step in which the query reception part receives input of a query;

an acquisition step in which the acquisition part acquires search results consisting of matched information and associated identification information of a search target satisfying the query among the search targets;

a correction step in which the correction part corrects the search results when matched information contained in the search results satisfies a given condition;

a presentation step in which the presentation part presents the matched information contained in the corrected search results; and a selection reception step in which the selection reception part receives a selection command on the presented matched information, wherein the storage stores identification information contained in the matched information constituting the acquired search results as identification information already searched, and identification information contained in the matched information selected with the selection command as identification information already selected; and the given condition is satisfied when a taboo character string is stored in the storage along with the associated identification information contained in the matched information and the stored taboo character string is contained in the query.

The program according to a third exemplary aspect of the present invention allows a computer to function as:

a query reception part receiving input of a query;

a storage part storing taboo character strings in association with identification information of search targets;

an acquisition part acquiring search results consisting of matched information containing identification information of a search target satisfying the query among the search targets;

a correction part correcting the search results when matched information contained in the search results satisfies a given condition;

a presentation part presenting the matched information contained in the corrected search results; and a selection reception part receiving a selection command on the presented matched information, wherein the storage part stores identification information contained in the matched information constituting the acquired search results as identification information already searched, and identification information contained in the matched information selected with the selection command as identification information already selected; and the given condition is satisfied when a taboo character string is stored in the storage in association with identification information contained in the matched information and the stored taboo character string is contained in the query.

The computer-readable, non-transitory information recording medium according to a fourth exemplary aspect of the present invention records a program allowing a computer to function as:

a query reception part receiving input of a query;

a storage part storing taboo character strings in association with identification information of search targets;

an acquisition part acquiring search results consisting of matched information containing identification information of a search target satisfying the query among the search targets;

a correction part correcting the search results when matched information contained in the search results satisfies a given condition;

a presentation part presenting the matched information contained in the corrected search results; and a selection reception part receiving a selection command on the presented matched information, wherein the storage stores identification information contained in the matched information constituting the acquired search results as identification information already searched, and identification information contained in the matched information selected with the selection command as identification information already selected; and the given condition is satisfied when a taboo character string is stored in the storage in association with identification information contained in the matched information and the stored taboo character string is contained in the query.

Here, the program of the present invention can be recorded on a computer-readable, non-transitory information recording medium such as a compact disc, flexible disc, hard disc, magneto-optical disc, digital video disc, magnetic tape, and semiconductor memory.

The above program can be distributed/sold via a computer communication network independently from a computer on which the program runs. Furthermore, the above information recording medium can be distributed/sold independently from the computer.

Efficacy of the Invention

The present invention can provide an information provisioning device, information provisioning method, program, and information recording medium suitable for presenting more appropriate search results to the user while using an existing search function.

DETAILED DESCRIPTION OF THE INVENTION

An embodiment of the present invention will be described hereafter. This embodiment is given for the purpose of explanation and does not confine the scope of the invention of the present application. The person of ordinary skill in the field may embrace an embodiment in which some or all components are replaced with equivalent counterparts and such an embodiment falls under the scope of the present invention.

(1. Information Provisioning System)

Figure 1:
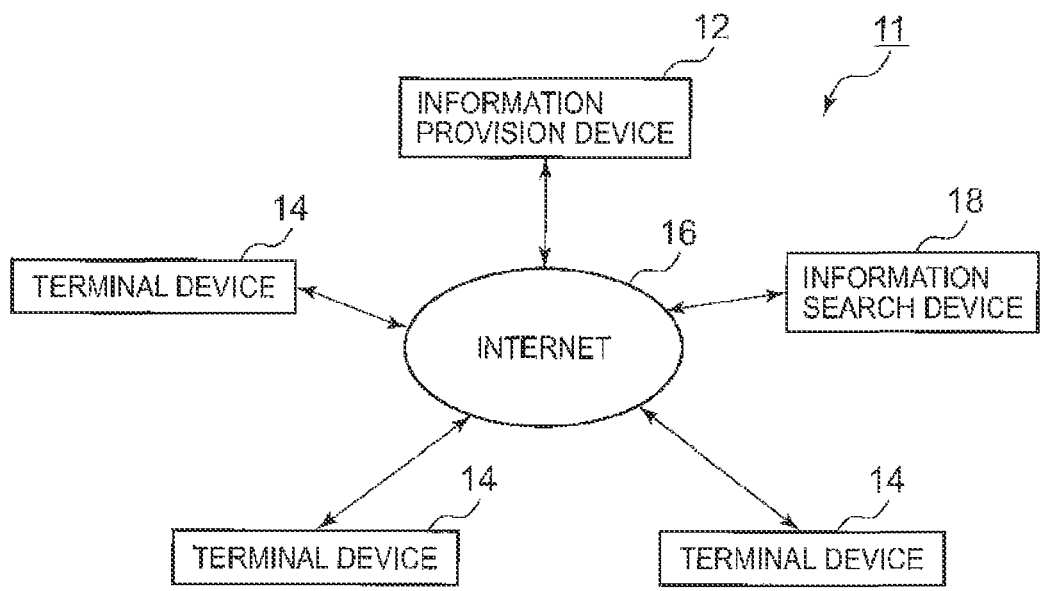
FIG. 1 is an explanatory illustration showing the general configuration of the information provisioning system according to an embodiment of the present invention.

FIG. 1 is an explanatory illustration showing the general configuration of the information provisioning system according to this embodiment. The following explanation will be made with reference to this figure.

In an information provisioning system 11, an information provisioning device 12 and terminal devices 14 are communicably connected via the Internet 16. Furthermore, in this embodiment, an information search device 18 is communicably connected to the information provisioning device 12 via the Internet 16.

The information provisioning device 12, terminal devices 14, and information search device 18 are each realized by running a program fulfilling the function of a specific application on a computer suitable for the specific application.

Here, the information provisioning device 12 realizes the function of a database accumulating data regarding products and/or services and the function of a web server in charge of communication with the terminal devices 14. In this embodiment, the information provisioning device 12 further realizes the electronic business transaction function enabling online sales of products and/or reservations for services.

The users who wish to conduct some investigation on a product or service use their own terminal device 14 to receive information regarding the product or service from the information provisioning device 12.

Furthermore, the product sellers and/or service providers who wish to register information regarding their product or service at the information provisioning system 11 use their own terminal device 14. The product sellers and/or service providers register data including various kinds of descriptive information such as descriptions and advertising statements regarding their products or services in the information provisioning device 12 using their terminal device 14.

The information search device 18 retains the data registered in the information provisioning device 12 for search and conducts preprocessing such as indexing on them so as to enable high-speed search based on queries.

A general search engine conducts search on electronic documents released on the Internet. The information search device 18 can be realized also by applying the above search engine function according to this embodiment to data registered in the information provisioning device 12. Alternatively, the information search device 18 can be realized by using a database specialized in the data registered in the information provisioning device 12.

In addition, the information provisioning device 12 and information search device 18 are realized by separate computers in this embodiment. However, the information provisioning device 12 and information search device 18 can be realized on a single computer.

The users, product sellers, and service providers use the browsers on the terminal devices 14 to communicate with the information provisioning device 12.

After a product seller or service provider registers data regarding his/her product or service in the information provisioning device 12, the information provisioning device 12 assigns identification information to the registered product or service. Then, the information provisioning device 12 associates the identification information with descriptive information and allows the information search device 18 to conduct preprocessing.

The information search device 18 conducts indexing for enabling high-speed search in the preprocessing. In addition, snippets presenting the summaries or outlines of the descriptive information of products and/or services can be created in advance in association with the identification information. The snippets can be created in accordance with a given query upon execution of search.

The user sends a query specifying a keyword regarding a desired product or service to the information provisioning device 12 via the terminal device 14, Then, the information provisioning device 12 sends to the terminal device 14 the search results acquired by executing a procedure described later as appropriate.

The search results include matched information corresponding to each piece of information regarding the searched product or service. Each piece of matched information includes the following information:

(a) identification information of the product or service;
(b) a snippet for the product or service; and
(c) the rank or score of the product or service.

The search results include multiple pieces of matched information when there are multiple products or services matching the query. On the other hand, the search results include no matched information when there is no product or service matching the query.

The rank or score does not need to be explicit information; it can be expressed by the order of matched information arranged in the search results. For example, of the matched information arranged as the search results, the first matched information has the highest score and ranked first, and the second matched information has the second highest score and ranked second.

If the user selects any matched information in the search results displayed on the screen of the terminal device 14, the selected matched information is sent to the information provisioning device 12.

Here, the term "select" in this embodiment refers to viewing detailed information of the product or service, or purchasing the product or making reservations for the service.

The information provisioning device 12 tracks history information such as search history and selection history on the products and/or services the user searched for or selected in the past. In other words, the information provisioning device 12 accumulates identification information of the products and/or services the user searched for and identification information of the products and/or services the user selected.

The information provisioning device 12 further tracks various pieces of personal information the user entered in advance (for example, name, gender, age, telephone number, email address, residential area, number of family members, etc.), and user identification information given to the user in advance. This kind of information is called user information.

Product sellers and/or service providers can set up information as for whom their product or service will be suitable (for example, age, gender, single person/couple/family-oriented, etc.). This kind of information is called attribute information.

The prior art information provisioning device 12 acquires the search results as a result of search by the external information search device 18 and sends the acquired search results as they are in the order of display to the terminal device 14 of the user.

This embodiment is characterized in that the information provisioning device 12 makes correction to the search results from the information search device 18 so as to provide the user with more appropriate search results while using the existing information search device 18 as it is.

The information provisioning device 12 according to this embodiment will be described further in detail hereafter.

(2. Information Provisioning Device)

The information provisioning device 12 according to this embodiment is realized by running a given program on a server computer.

Figure 2:
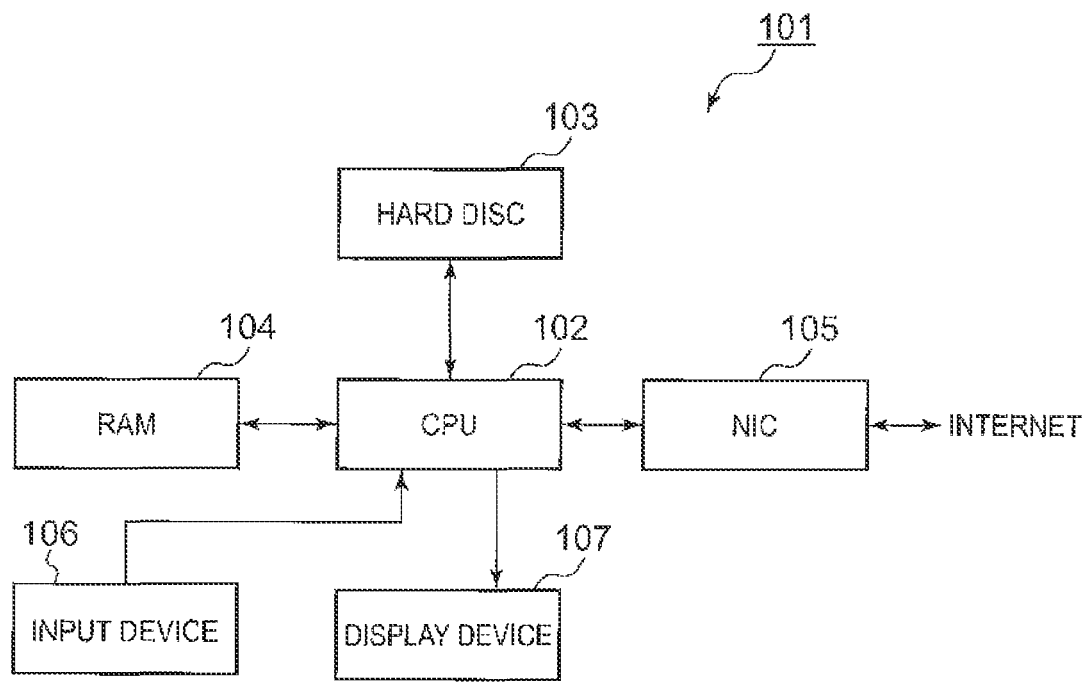
FIG. 2 is an explanatory illustration showing the general configuration of a computer running a given program so as to realize the information provisioning device according to the embodiment.

FIG. 2 is an explanatory illustration showing the general configuration of a computer running a given program so as to realize the information provisioning device 12 according to this embodiment. The following explanation will be made with reference to this figure.

A computer 101 according to this embodiment realizes the information provisioning device 12 as a CPU (central processing unit) 102 reads a program recorded on a hard disc 103 into a RAM (random access memory) 104 and runs the program, and controls a NIC (network interface card) 105.

In other words, the CPU 102 controls the operation of the entire computer 101, is connected to the components, and exchanges control signals and data signals.

The hard disc 103 is a large capacity external storage medium and non-temporarily records programs executed by the CPU 102 and data to be processed by the programs.

The RAM 104 stores data and programs to be processed by the CPU 102 during processing so as to enable the processing and execution.

The NIC 105 is used to connect the computer 101 to the Internet 16. It is possible to obtain data and/or programs to be processed by the CPU 102 from the Internet 16 via a signal medium temporarily transferring various kinds of information.

The computer 101 is additionally provided with an input device 106 for the administrator of the information provisioning device 12 to make various kinds of input, and a display device 107 for displaying information from the information provisioning device 12 to the administrator.

Although the capabilities of the parts of the computer 101 shown in the figure can be changed as appropriate, the principle of operation that the CPU 102 runs programs to control the parts and realize various devices, does not change. For example, the computer 101 runs a program for the terminal to realize the terminal device 14 and a program for information search to realize the information search device 18.

Furthermore, it is possible to run a program for the information provisioning device 12 and a program for the information search device 18 in parallel so that a single computer 101 realizes the information provisioning device 12 and information search device 18 concurrently.

Some portable terminals such as various types of cell-phones, smart-phones, and PDAs (persona data assistants) utilize a flash memory instead of the hard disc 103 and/or a communication interface to a cell-phone network instead of the NIC 105. However, such functional configurations are the same as the computer 101.

Figure 3:
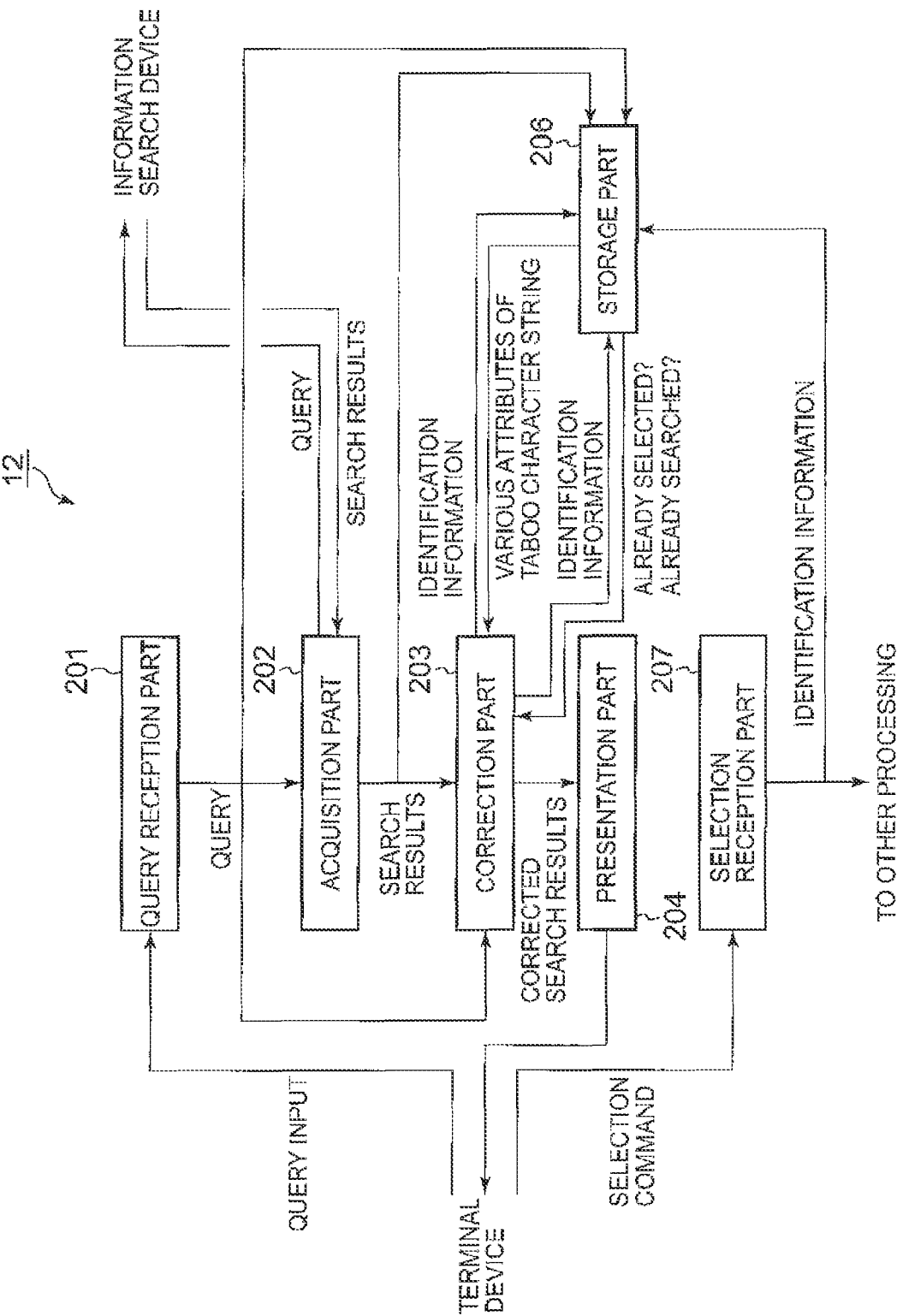
FIG. 3 is an explanatory illustration showing the general configuration of the information provisioning device according to the embodiment.
Figure 4:
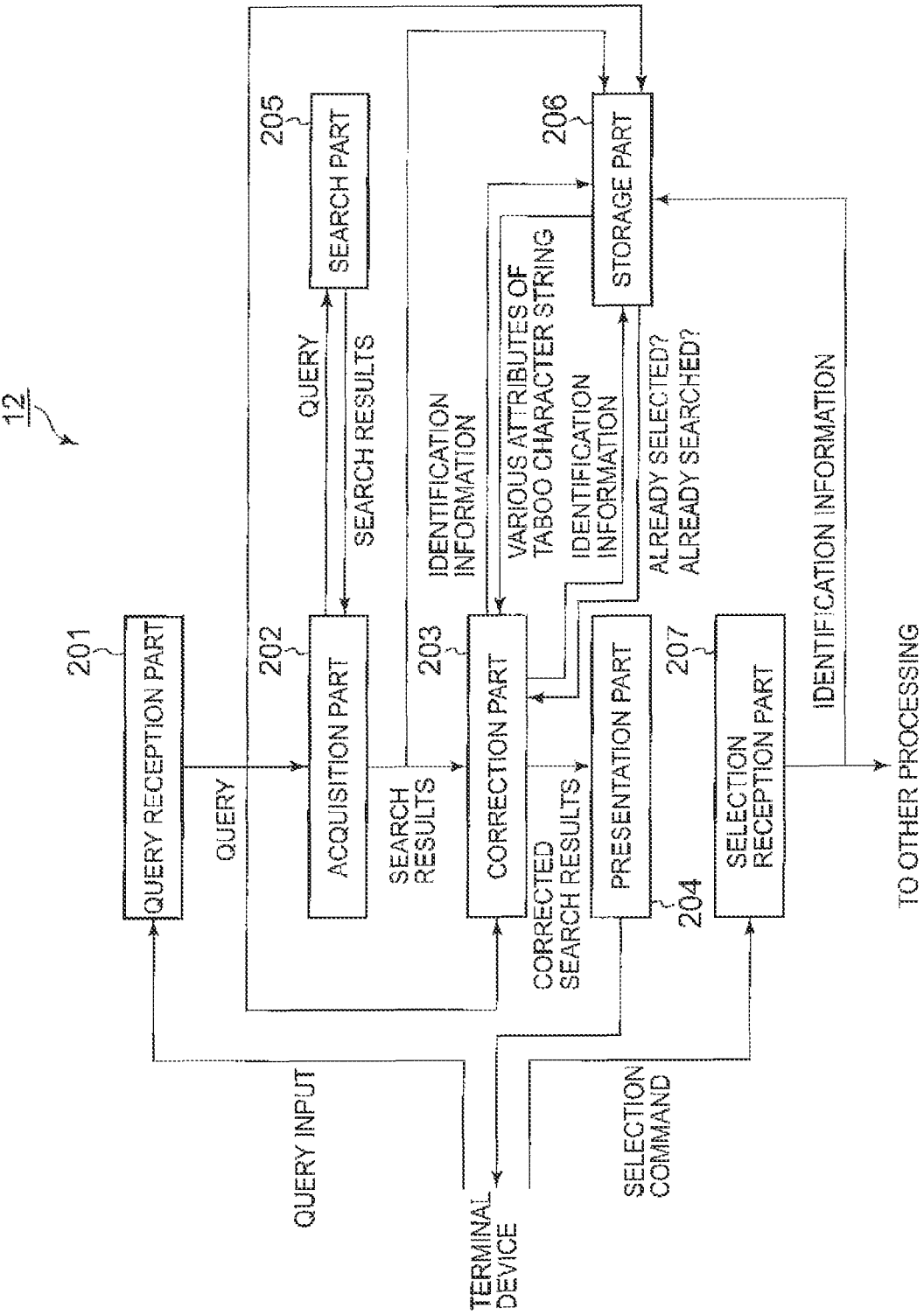
FIG. 4 is an explanatory illustration showing the general configuration of the information provisioning device according to the embodiment.

FIGS. 3 and 4 are explanatory illustrations showing the general configuration of the information provisioning device 12 according to this embodiment. The following explanation will be made with reference to these figures.

As shown in the figures, the information provisioning device 12 comprises a query reception part 201, an acquisition part 202, a correction part 203, and a presentation part 204.

Depending on the configuration, the information provisioning device 12 may comprise a storage part 206 and a selection reception part 207. FIGS. 3 and 4 show a configuration including these components.

FIG. 3 shows a configuration excluding a search part 205 and FIG. 4 shows a configuration including the search part 205.

The query reception part 201 receives input of a query sent from the terminal device 14 used by the user. Then, in this embodiment, the NIC 105 or the like functions as the query reception part 201 under the control of the CPU 102 of the computer 101.

On the other hand, the acquisition part 202 acquires search results consisting of matched information including identification information and snippets of search targets fulfilling the query.

In this embodiment, the NIC 105 or the like of the computer 101 function as the acquisition part 202 under the control of the CPU 102.

In the embodiment shown in FIG. 3, the acquisition part 202 sends the received query to the external information search device 18 so that the external information search device 18 conducts search. Then, the acquisition part 202 acquires the search results from the external information search device 18.

In the embodiment shown in FIG. 4, the search part 205 of the information provisioning device 12 has the same function as the external information search device 18. Thus, the search part 205 conducts search based on the query within the information provisioning device 12.

In such a case, the search part 205 is realized on the computer 101 by the CPU 102 accessing the hard disc 103 storing databases and utilizing the RAM (random access memory) 104 and/or hard disc 103 as the area for managing temporary information during processing.

The search results acquired by the acquisition part 202 are temporarily retained in the RAM 104.

Then, the correction part 203 corrects the search results.

The method of correcting the search results can consist of removing matched information that is inappropriate and better not to be seen by the user if possible from the search results to narrow down, or lowering the rank of inappropriate matched information.

Thus, the correction part 203 is realized on the computer 101 by the CPU 102 cooperating with the RAM 104 and/or hard disc 103.

Then, the presentation part 204 presents the matched information contained in the corrected search results.

In this embodiment, the information provisioning device 12 sends the corrected search results to the terminal device 14. The terminal device 14 receives the search results and the matched information contained in the received search results is presented on the screen of the terminal device 14.

Thus, in this embodiment, the NIC 105 functions as the presentation part 204 by communicating with the terminal device 14 under the control of the CPU 102.

Furthermore, the selection reception part 207 receives a selection command on the presented matched information from the user.

In other words, the selection reception part 207 receives a request to view detailed information of the product or service or a request to purchase the product or make reservations for the service from the user who was presented the search results. After receiving a selection command, an ordinary online sales procedure is activated.

Thus, in this embodiment, the NIC 105 functions as the selection reception part 207 by communicating with the terminal device 14 under the control of the CPU 102.

The storage part 206 further stores the following information:

(a) taboo character strings, or so-called NG (no good) words, for products and/or services associated with product and/or service identification information;

(b) attribute information indicating the categories of products and/or services; and (c) user information indicating the categories of users.

The above information is information that is not frequently updated.

Of the information stored in the storage part 206, the attribute information and user information can be set up by the product sellers and/or service providers and users themselves. On the other hand, taboo character strings are set up by the administrator of the information provisioning device 12.

A known evaluation system extensively used in the SNSs (social network systems) can be employed to set up the taboo character strings for products and/or services without the user being aware of it.

The storage part 206 further stores the following information.

(d) Identification information corresponding to the matched information contained in the search results (before being corrected by the correction part 203) for the query from the user is stored as identification information already searched by the user. If there are a huge number of search results, it is not likely that all the matched information contained in the search results is presented to the user. Therefore, it is possible to store only the identification information corresponding to, for example, the top 100 matched information items of all matched information contained in the search results as the identification information already searched by the user.

(e) Identification information corresponding to the matched information selected with a selection command from the user is stored as identification information already selected by the user. After a request to view detailed information of the product or service or a request to purchase the product or make reservations for the service is made, the identification information of the product or service becomes one of those already selected.

The above information frequently changes according to the actions of the user.

In this embodiment, the storage part 206 is realized on the computer 101 by the hard disc 103 or the like constituting a service information database and/or user information database under the control of the CPU 102.

Since the information of the above (a), (b), and (c) and the information of the above (d) and (e) are different in time to be stored and/or in subject to set up for, they can be managed in multiple separate databases. In such a case, the multiple databases together realize the storage part 206.

Figure 5:
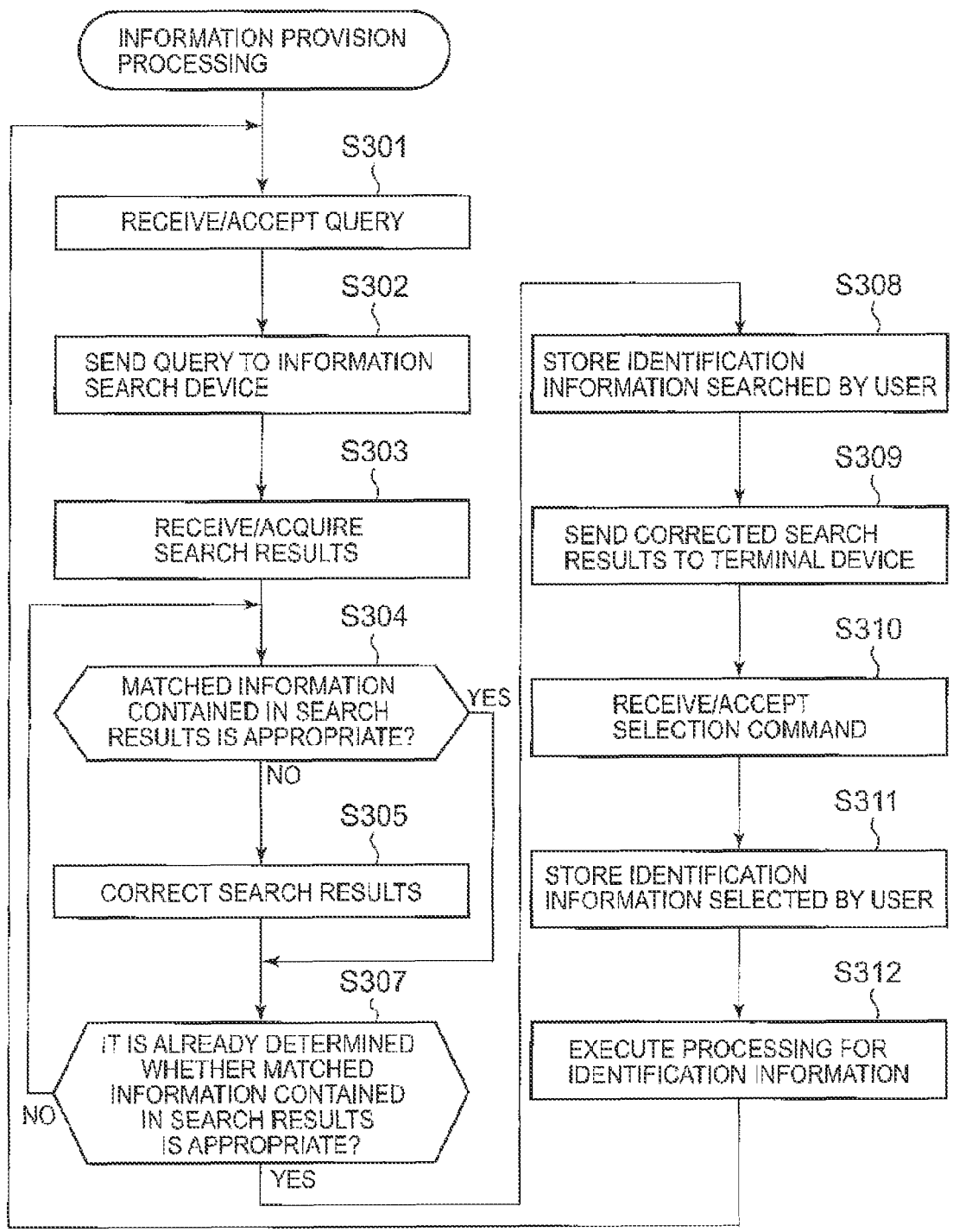
FIG. 5 is a flowchart showing the control flow in the information provisioning procedure executed in the information provisioning device according to the embodiment.

FIG. 5 is a flowchart showing the control flow in the information provisioning procedure executed by the information provisioning device 12 according to this embodiment. The following explanation will be made with reference to this figure.

As the information provisioning procedure starts, the information provisioning device 12 receives a query sent from the terminal device 14 (Step S301). This reception of a query means that the query reception part 201 executes reception of query input.

Receiving the query, the acquisition part 202 sends the query to the external information search device 18 (Step S302).

Then, the information provisioning device 12 receives the search results sent from the information search device 18 (Step S303). This reception of the search results means that the acquisition part 202 executes acquisition of search results.

Then, the correction part 203 determines whether the matched information contained in the search results is appropriate (Step S304). Various schemes of determining whether the results are appropriate will be described later.

Then, if the matched information is appropriate (Step S304; Yes), simply proceeds to Step S307.

On the other hand, if the matched information is not appropriate (Step S304; No), the search results containing the matched information are corrected (Step S305), then proceeding to Step S307.

The search results can be corrected by:

(a) deleting the matched information from the search results;

(b) changing the rank of the matched information so that it is ranked lower in the search results; or (c) lowering the score of the matched information so that it is ranked lower in the search results.

Here, it is determined whether search results are or are not appropriate. However, it is possible to calculate "an appropriateness level" as described later and adjust the score or rank of the matched information according to the appropriateness level.

Furthermore, when the rank of matched information is indicated by the order of matched information within the search results, the correction to change the rank can be made by altering the order of matched information within the search results.

With the above configuration, the rank or score of matched information can be changed so that the matched information is ranked lower if it is of a lower level of appropriateness or of a greater degree of inappropriateness.

It is determined whether the above-described determination as to whether matched information is appropriate is completed for all the matched information (Step S307). If it is completed (Step S307; Yes), proceeds to Step S307. If it is not completed (step S307; No), returns to Step S304. After all the matched information is determined to be appropriate or not as described above, the search results to be presented to the user in which matched information containing inappropriate language is corrected can be obtained.

In the above-described search results, product or service information that is better not to be seen by the user if possible is deleted or ranked lower. Therefore, the information provisioning system 11 will not lose the trust of the user.

In the Steps S304 to S307, the search results are corrected on the basis of each piece of matched information. The search results can be corrected at a time. For example, after the scores of all the matched information are changed, the matched information is deleted from the search results based on the score, or altered in rank within the search results.

Obtaining the search results, the storage part 206 stores identification information corresponding to the matched information contained in the search results as those already searched by the user who sent the query (Step S308).

In other words, the storage part 206 associates and stores the identification information corresponding to the products and/or services contained in the results of search by the user with user identification information of the user as search history.

Then, the presentation part 204 sends the corrected search results to the terminal device 14 (Step S309).

Receiving the corrected search results, the terminal device 14 displays the matched information contained in the search results in the corrected order on the display means such as a browser of the terminal device.

The matched information contained in the corrected search results contains link information (for example, a URL (universal resource locator)). A selection command of the user on the matched information is sent from the terminal device 14 to the information provisioning device 12 based on user operation (for example, clicking the mouse or tapping on the touch panel) on the link information.

On the other hand, the information provisioning device 12 receives the selection command by the user sent from the terminal device 14 (Step S310). This reception of a selection command means that the selection reception part 207 executes reception of a selection command.

As the selection command is received, the storage part 206 stores the identification information corresponding to the selected matched information as one of those already selected by the user who sent the selection command (Step S311).

In other words, the storage part 206 associates and stores the identification information corresponding to the product or service regarding a request to view detailed information or a request to purchase or make reservations from the user with the user identification information of the user as selection history.

Then, the information provisioning device 12 executes a response procedure corresponding to the request to view or request to purchase or make reservations specified by the selection command from the user in regard to the identification information using the web server function and/or electronic business transaction function (Step S312), then returning to Step S301.

In the response procedure activated in the Step S312, detailed information of the product or service is provided or application for purchasing the product or making reservations for the service is processed. Details of these processes are the same as those of existing online sales or online reservations of products or services.

As described above, in this embodiment, the storage part 206 stores the history of actions of the user including search history and selection history. However, if the history of actions of the user is unnecessary in the determination described later, the storage part 206's procedures to store the history can be eliminated.

Furthermore, in this embodiment, the storage part 206 stores attributes of the products, services, sellers, and providers, and attributes of the users. However, if attributes of the products, services, sellers, and providers and attributes of the users are unnecessary in the determination described later, the storage part 206's procedures to store the attributes can be eliminated.

Figure 6:
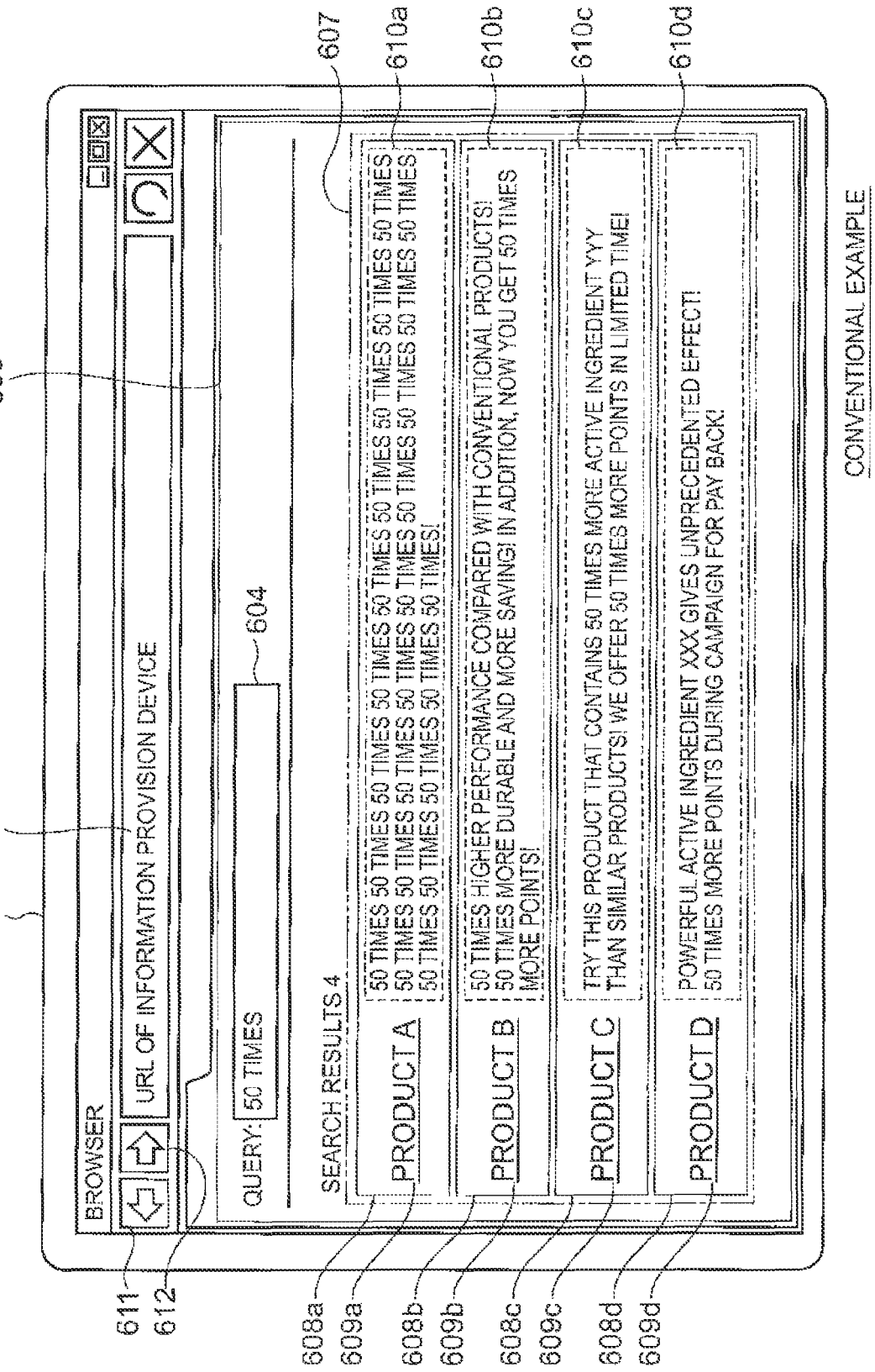
FIG. 6 is an explanatory illustration showing how the terminal device presents the search results to the user in the prior art.
Figure 7:
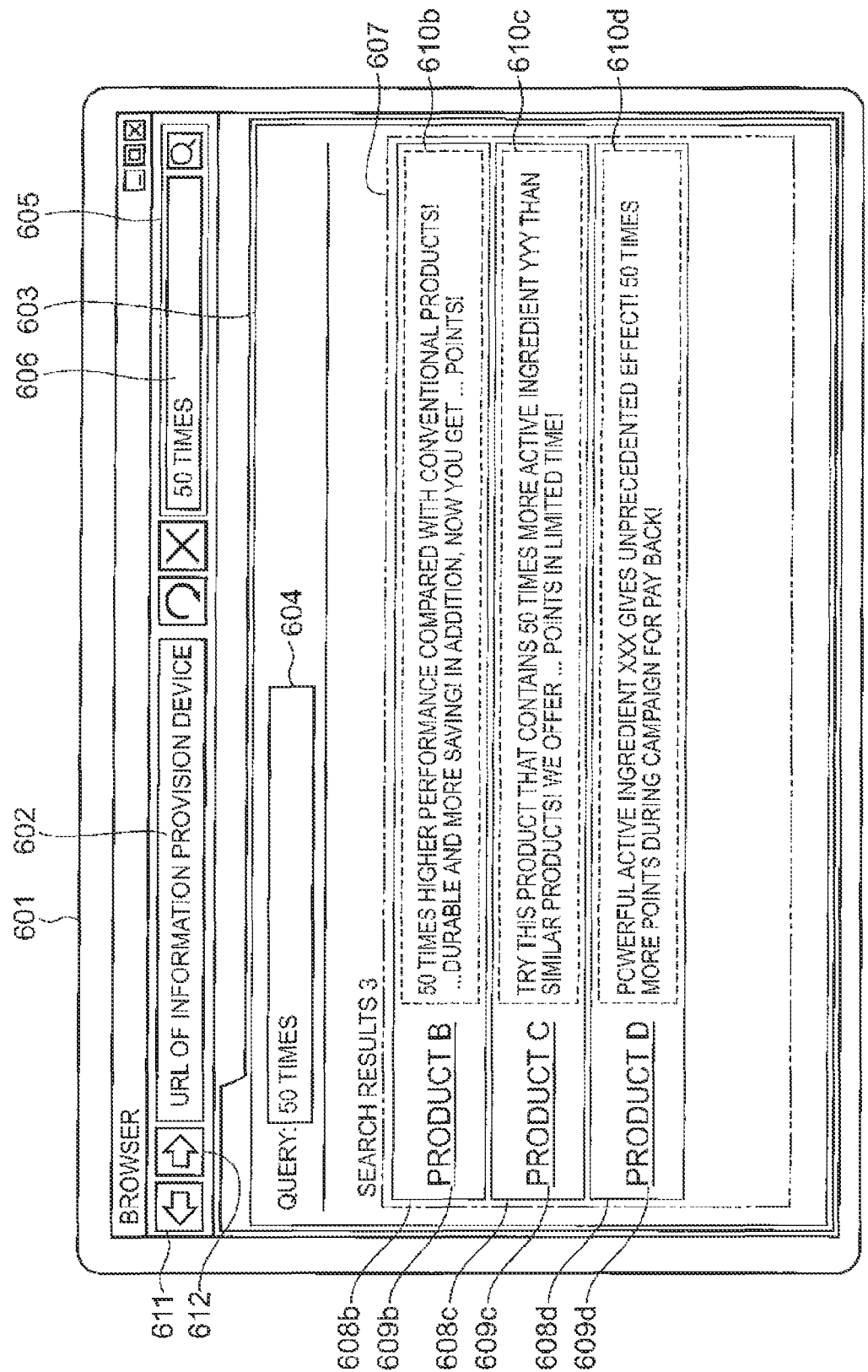
FIG. 7 is an explanatory illustration showing how the terminal device presents the search results to the user in the embodiment.

FIG. 6 is an explanatory illustration showing an exemplary display for the terminal device 14 to present search results to the user in the prior art. FIG. 7 is an explanatory illustration showing an exemplary display for the terminal device 14 to present search results to the user in this embodiment. The following explanation will be made with reference to these figures.

The exemplary display in these figures is obtained as follows. On the computer 101, the CPU 102 reads and runs a browser program recorded on the hard disc 103 onto the RAM 104, receives input from the user via the input device 106, requires the information provisioning device 12 for various kinds of information via the NIC 105, and displays the obtained information on the display device 107.

Operation through the browser displayed on the screen 601 of the display device 107 and how search results are displayed as shown in FIGS. 6 and 7 through the operation will be described hereafter.

First, as the user enters the URL of the information provisioning device 12 in a URL input field 602, an HTML (hyper text markup language) document is sent from the information provisioning device 12 to the terminal device 14.

The HTML document is formatted based on style sheet information and tag information specified in the HTML document and displayed in a content display area 603 of the browser screen 601.

The HTML document sent from the information provisioning device 12 contains tag information for forming a query input field 604. As the user enters a keyword regarding his/her desired product or service in the query input field 604, the query is sent from the terminal device 14 to the information provisioning device 12.

In addition, in the embodiment shown in FIG. 7, a search tool bar 605 prepared as an add-on or plug-in to the browser is provided. A query input field 606 is provided within the search tool bar 605. The user does not need to enter the URL of the information provisioning device 12 and wait for the query input field 604 being displayed in the content display area 603. Instead, the user can directly enter a keyword in the query input field 606 within the search tool bar 605, whereby the query is sent from the terminal device 14 to the information provisioning device 12.

Here, it is assumed that the user is interested in a product or service that is a campaign target for which 50 times more points are given and a keyword "50 times" is entered in the query input field 606 in these figures.

Then, the information provisioning device 12 executes the information provisioning procedure shown in FIG. 5. The information provisioning device 12 according to this embodiment sends an HTML document created based on the corrected search results to the terminal device 14 while the information provisioning device according to the prior art creates and sends an HTML document to the terminal device 14 without correcting the search results acquired from the information search device 18 or internal search part 205.

The HTML document created based on the search results contains metatag information for forming a search results display field 607. In both of FIGS. 6 and 7, multiple pieces of matched information 608 are displayed in the search results display field 607. As mentioned above, since the user has entered the keyword "50 times," the matched information 608 contains identification information 609 and snippets 610 of products and/or services containing the keyword "50 times" in descriptive information such as descriptions and advertising statements.

Here, in the figures, in order to distinguish individual pieces of matched information 608, and identification information 609 and snippets 610 contained in the matched information from each other, their reference numbers have suffixes consisting of lower-case English letters.

In FIGS. 6 and 7, the identification information 609 is presented by a link for viewing detailed information of the product or service, and underlined to indicate that the link is selectable. As the user selects the link with a mouse or keyboard, a selection command is sent from the terminal device 14 to the information provisioning device 12.

The snippets 610 contain the keyword "50 times" entered by the user.

Here, comparison of the search results display field 607 between FIGS. 6 and 7 reveals that there is a little difference in the displayed matched information 608.

As shown in FIG. 6, the matched information 608a, matched information 608b, matched information 608c, and matched information 608d are matched information regarding a product A, product B, product C, and product D, respectively.

In the matched information 608a, the phrase "50 times" is repeatedly used to fill most of the entire snippet 610a while the phrase "50 times" is used one to three times in the snippet 610b of the matched information 608b, the snippet 610c of the matched information 608c, and the snippet 610d of the matched information 608d. In this exemplary display, the search results in which a higher rank is given as the keyword appears more frequently in the snippet are displayed.

On the other hand, in FIG. 7, the matched information 608b, matched information 608c, and matched information 608d are displayed, but the matched information 608a is not displayed. This is as a result of a determination scheme 1 described later. Since the snippet 610a contains almost no information unknown to the user, the matched information 608a is determined to be inappropriate and deleted from the search results.

Furthermore, unlike FIG. 6, the phrase "50 times" appears once in the first use and is replaced with an omit symbol in the subsequent uses in the snippets 610b, 610c, and 610d of the matched information 608b, 608c, and 608d.

As described above, in this embodiment, matched information appropriate and useful for the user who has entered the query is given priority in presentation.

Various schemes to determine whether the matched information is appropriate will be described hereafter.

(3. Determination Scheme 1)

The first determination scheme utilizes the character string of the query entered by the user.

As the user specifies a desired keyword to use a conventional search engine, the URLs of documents in which the keyword appears and snippets presenting the summaries or outlines of the documents are presented to the user as the search results.

In this embodiment, with the configuration in which the information search device 18 creates snippets presenting the outlines of descriptions or advertising statements of products and/or services, the snippets are associated on the basis of matched information and sent to the information provisioning device 12.

On the other hand, with the configuration in which the information provisioning device 12 tracks the snippets, the information search device 18 sends identification information of products and/or services to the information provisioning device 12 and the information provisioning device 12 associates the identification information with the snippets to constitute matched information.

The snippets are important information for the user to compare and examine matched information. The character string of the keyword specified by the user and contained in the query almost always appears in the snippets. The character string of the keyword is known to the user since it was specified by the user.

Therefore, the character string contained in a processed snippet from which the character string of the keyword has been removed can be considered to be unknown and useful information for the user.

As described above, in this determination scheme, the character string contained in a processed snippet from which the character string of the keyword has been removed, namely the character string obtained by removing the character string contained in the query from the snippet is used to determine whether the matched information is appropriate.

Generally, the matched information of which the processed snippet contains a more informative character string is considered to be more useful and appropriate for the user than the matched information of which the processed snippet contains a less informative character string. The matched information is considered to be useless and inappropriate for the user if the processed snippet thereof contains a character string that is extremely lacking in information.

For example, it is assumed that this embodiment is applied to an electronic business transaction system with which points are accumulated upon each purchase of a product or service, and the user specifies a keyword "50 times" to search for a campaign target product or service for which 50 times more points are given. On the other hand, it is assumed that the product seller or service provider created an advertising statement in which the phrase "50 times" is repeatedly used such as "50 times 50 times 50 times 50 times 50 times 50 times 50 times!" as an advertising statement for the campaign target product or service.

Then, the phrase "50 times" is repeatedly used such as "50 times 50 times 50 times 50 times 50 times 50 times 50 times!" also in the snippet created from the above advertising statement.

Since the advertising statement contains many of the keyword "50 times," the information search device 18 ranks the product or service higher in the search results. However, the snippet to be presented consists of only a string of the specific keyword and contains very little useful information for the user.

In this example, the keyword "50 times" is removed from the snippet "50 times 50 times 50 times 50 times 50 times 50 times 50 times!" Then, the processed snippet consists of a character "!"

In this example, the quantity of useful information regarding the product or service is estimated based on the processed snippet "!"

The quantity of information can be estimated most simply by assuming that "the inappropriateness level" is higher as the character string contained in the processed snippet is shorter.

As in the above example, if the product seller or service provider creates description or an advertising statement in which only the keyword the user is likely to use for search is repeatedly used, only the keyword repeatedly appears also in the snippet. When the keyword is specified in the query, the processed snippet contains a very short character string as a result of the above processing if the keyword is contained in the query specified by the user.

Then, the matched information corresponding to data regarding a product or service in the description or advertising statement of which the keyword is repeatedly used is determined to be inappropriate. The matched information is changed in rank for presentation and less likely to be seen by the user.

Another method of estimating the quantity of information of the character string contained in the processed snippet with accuracy to determine whether the matched information is appropriate consists of compressing the character string contained in the processed snippet by an appropriate compression algorithm such as the sliding dictionary method and arithmetic code compression method.

In this determination scheme, the determination can be as follows. The matched information corresponding to a snippet is of a higher appropriateness level as the compression outcome of the character string contained in the processed snippet consists of a larger number of bits, and the matched information is of a lower appropriateness level as the compression outcome consists of a smaller number of bits.

In this determination scheme, the appropriateness level is obtained in numeric values. When a score is assigned to each piece of matched information, the score can be corrected using such numeric values. The correction part 203 corrects the ranks of matched information using the corrected scores to create the corrected search results.

On the other hand, it is possible to compare the obtained appropriateness level with a predetermined threshold to determine whether the matched information corresponding to the appropriateness level is appropriate.

The character string entered by the user as a query is not always one of those anticipated by the administrator of the information provisioning device 12. One of the characteristics of this determination scheme is that inappropriately matched information can be deleted or ranked differently even though the information provisioning device 12 does not manage so-called NG words at all.

Here, the unprocessed snippet or processed snippet can be presented while presenting the matched information to the user. In addition, apart from processing for determining the appropriateness level, it is possible to make changes in the unprocessed snippet by not deleting the part of the first appearance of the keyword specified by the user and deleting or replacing with an omit symbol the parts of the second and subsequent appearance of the keyword, and then present the changed snippet to the user.

(4. Determination Scheme 2)

This determination scheme utilizes the history of action of the user and taboo character strings imposed on the products and/or services and product sellers and/or service providers to determine whether these are appropriate.

Some product sellers and/or service providers may use a substantially unsuitable character string in a description or an advertising statement of a product or service in an attempt to increase the users in number.

For example, the character string "quiet" is inappropriate as description for the accommodation service of a hotel situated in downtown. On the other hand, the character string "quiet" is appropriate as description for the accommodation service of an inn in a remote area.

Then, such inappropriate character strings are kept in the storage part 206 for each product or service or for each product seller or service provider based on feedback from the users and/or checkup by the administrator of the information provisioning device 12. Such character strings are called taboo character strings.

Obscene or immoral words and words against public order and morality are often selected as NG words by search engines.

However, this determination scheme is characterized in that an ambiguous word that is not obscene or immoral or against public order and morality by itself, and appropriate for some products and/or services, but is inappropriate for a specific product or service is selected as a taboo character string.

In the simplest embodiment of this determination scheme, it is determined to be inappropriate if the following condition (a) is satisfied:

Condition (a) "the query contains a taboo character string stored in the storage part 206 in association with the identification information specified by the matched information."

This scheme is considered to be application of a NG words technique to finely itemized products and/or services.

In an embodiment including additional conditions, the following conditions (b) and (c) are added to the above condition (a) and it is determined to be inappropriate when the three conditions (a), (b), and (c) are all satisfied:

Condition (b): "the identification information specified in the matched information is stored in the storage part 206 as one of those already searched by the user"; and Condition (c): "the identification information specified in the matched information is not stored in the storage part 206 as one of those already selected by the user."

The conditions (b) and (c) will be satisfied for matched information that was presented to the user in the past but in which the user had no interest.

It is supposedly beneficial for the user to control the rank in display or display itself of the product or service of which the matched information is as described above and of which the description contains an inappropriate keyword.

Here, this determination scheme is intended to exclude the product or service from the search results even if an inappropriate word is used for search. Therefore, the administrator of the information provisioning device 12 does not need to do any specific task even if some product seller or service provider deletes a taboo character string from the description or advertising statement. This is because it is a natural consequence that the product or service is excluded from the search results for any query containing the taboo character string since the taboo character string is deleted.

Here, it is possible to accumulate statistic information as to whether matched information satisfies the conditions (b) and/or (c) for each keyword contained in queries in the past search by all users. In other words, the number of users with whom the condition (b) is satisfied, B, and the number of users with whom the condition (c) is satisfied, C, are traced for specific matched information searched with a specific keyword.

If the ratio of C to B is equal to or lower than a given significantly low threshold in spite of the fact that a large number of users have conducted search and the number B is equal to or greater than a given number of samples and sufficiently high, the keyword is presumably inappropriate for the matched information. The given number of samples and given significantly low threshold can be set as appropriate according to the target to apply.

The given number of samples can be a constant that is a statistically significant number of times of search (for example, 100, 500, 1000, etc.). Furthermore, for setting a taboo character string periodically, for example every other month, by estimating whether the keyword is appropriate, it is possible to count the number of users satisfying the condition (b) in each period in regard to the identification information stored in the storage part 206, calculating the average number per period of users satisfying the condition (b), multiplying the average by a positive constant less than 1 (for example, 0.1, 0.3, 0.5, etc.) to obtain a value used as the number B in the next period. Alternatively, it is possible to employ the average of them or a smaller value among them as the number B in the next period.

The significantly low threshold can be a positive constant less than 1 (for example, 0.001, 0.0001, 0.00001, or 0, etc.). For setting a taboo character string by estimating whether the keyword is appropriate periodically as described above, the following scheme can be employed. In other words, the number of users satisfying the condition (c) in each period is counted in regard to the identification information stored in the storage part 206. The average number per period is calculated. The average is multiplied by a positive constant less than 1 (for example, 0.1, 0.01, 0.001, or 0, etc.) to obtain a value used as the number C in the next period. Alternatively, it is possible to employ the average in the above scheme or a smaller value among them as the number C in the next period.

Using the above estimation result, information on taboo character strings stored in the storage part 206 can be updated appropriately based on the history of action of users.

(5. Determination Scheme 3)

Some product sellers and/or service providers may set substantially unsuitable attribute information for a product or service in an attempt to increase the users in number.

For example, an attribute "family-oriented" is inappropriate for the accommodation service of a hotel having only single-bed rooms.

Then, the Determination Scheme 3 utilizes the following condition (d) instead of the above conditions (b) and (c) in the Determination Scheme 2:

Condition (d): "the attribute information of data stored in the storage part 206 in association with the identification information specified in matched information does not match the attribute information of the user stored in the storage part 206 in association with the user."

Use of the condition (d) can prevent, for example, a family-oriented hotel from being recommended to a single person.

Here, it is possible to use, for example, the technique disclosed in Patent Literature 2 for determining whether the user attribute information regarding a user and the data attribute information regarding a product or service match.

(6. Determination Scheme 4)

The above Determination Schemes 1 to 3 can be used in combination as appropriate. For example, using all of the Determination Schemes 1 to 3, the matched information can be ranked lower or excluded from presentation when any of the conditions is satisfied.

Furthermore, the condition (a) is common to the Determination Schemes 2 and 3. Reuse of the determination result of the condition (a) leads to high speed calculation processing.

(7. Other Configuration)

In the above configuration, upon search for a search target such as a product or service in an electronic products or services transaction system, the rank in display or whether to display is controlled when presenting the product or service to the user if descriptive information describing details of the product or service contains inappropriate language.

In this embodiment, particularly the above-described Determination Scheme 1 is applied to a broader range of search systems and the terminal device 14 functions as an information provisioning device.

The search target in this embodiment is not data regarding products and/or services, but electronic documents released on the Internet 16.

The information search device 18 functions as a so-called search engine. In other words, the information search device 18 periodically crawls through the documents released on the Internet 16, and retains various kinds of document data such as keywords contained in the documents, URLs of the documents, and caches of the documents.

As the user enters a desired keyword in the query input field 604 or query input field 606 for the information search device 18 using the terminal device 14, the keyword is transferred to the information search device 18 via the Internet 16.

The information search device 18 searches its own document data for documents containing the keyword transferred from the terminal device 14, and creates snippets by extracting the part where the keyword appears and the text before and after the part from the cache of the documents obtained as a result of the search. Upon the search, the documents are ranked.

Then, the information search device 18 makes pairs of the URLs of the documents and the snippets of the documents to create an HTML document in which the pairs are arranged according to the ranks of the documents. An HTML document is a so-called structured document in which the character strings are structured using various metatags.

Within an HTML document, the URL and snippet of a document are enclosed by given metatags to clearly indicate that they are information regarding a single document. The information enclosed by the metatags is arranged in sequence to indicate the ranks of the documents.

The HTML document created in the above process corresponds to the search results. Furthermore, the information of the URL and snippet of a document enclosed by the tags in the HTML document corresponds to the matched information.

Then, the information search device 18 sends the created HTML document to the terminal device 14.

Receiving the HTML document, the terminal device 14 formats and displays the HTML document on the display screen of the browser.

In the prior art, the browser of the terminal device 14 formats and displays the HTML document sent from the information search device 18 on the display screen of the browser as it is.

In this embodiment, the browser of the terminal device 14 further processes the HTML document obtained from the information search device 18.

In order words, obtaining the HTML document of the search results, the browser of the terminal device 14 analyzes its structure and acquires the matched information consisting of the URL and snippet of a document enclosed by given metatags in sequence.

Then, for each piece of matched information acquired, the browser of the terminal device 14 obtains a character string by removing the keyword used in the search from the snippet, and determines whether the matched information is appropriate from the length of the obtained character string or the compression rate of the obtained character string compressed with a given compression algorithm.

Then, if the matched information is not appropriate, the browser of the terminal device 14 deletes the part regarding the inappropriately matched information from the HTML document or moves the part regarding the inappropriately matched information down in the HTML document. In other words, the browser of the terminal device 14 corrects the HTML document dynamically.

After the HTML document is corrected in the above process, the corrected HTML document is displayed on the display screen of the browser of the terminal device 14.

The HTML document can be corrected in parallel while it is displayed on the display screen of the browser of the terminal device 14. Alternatively, the HTML document can be displayed after it is completely corrected.

As described above, in this embodiment, the search results obtained from an existing search engine realized by the external information search device 18 are corrected by the browser of the terminal device 14 dynamically.

The above dynamic correction function can be added to an existing browser as a plug-in or add-on. The program of the plug-in or add-on is written in a script language working with the browser and realizes the above process using the function of dynamically correcting an HTML document based on the DOM (document object model).

This embodiment can control whether to display or the rank in display of a document that is considered to be of a low value for the user in the search results, such as the one in which a specific keyword is repeatedly used, in using an existing search engine through the browser of the terminal device 14.

(8. Automatic Setting of Taboo Character Strings)

In the above embodiment, the administrator of the information provisioning device 12 sets taboo character strings. Taboo character strings can be set automatically by analyzing the action the user took after he/she obtained the search results via the browser.

As shown in FIG. 7, the search results contain link information such as the URLs of documents in which the keyword appears.

If the user selects link information through user operation on the link information such as clicking the mouse and tapping the touch panel, the selection command is sent from the terminal device 14 to the information provisioning device 12 and, as a result, the content associated with the link information is displayed in the content display area 603.

Figure 8:
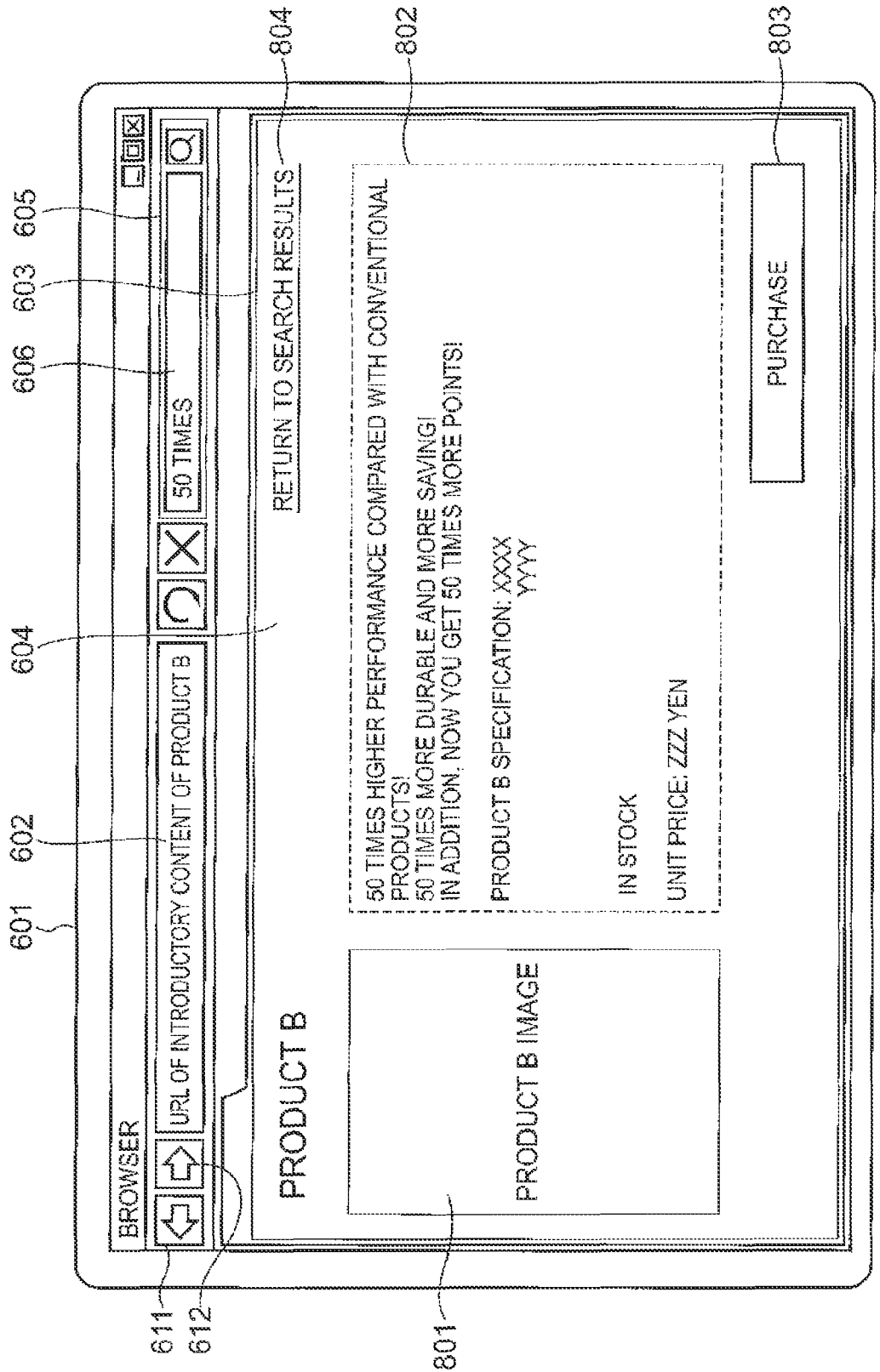
FIG. 8 is an explanatory illustration showing how the terminal device presents the content regarding link information contained in the search results to the user in the embodiment.

FIG. 8 is an explanatory illustration showing an exemplary display for the terminal device 14 to present the content regarding link information to the user after the user selects one of the link information contained in the search results shown in FIG. 7.

As shown in FIG. 8, the URL regarding the link information selected by the user is displayed in the URL input field 602 of the screen 601. Furthermore, the content specified by the URL of the link information is displayed in the content display area 603.

In this exemplary display, the content for introducing the product is displayed on the screen. Within the content, a product image 801 presenting the appearance of the product, an introductory statement 802 for introducing the product, a purchase button 803 for placing the product in an electronic cart for purchase, and a link "return" 804 for returning to the screen displaying the search results are provided.

The snippet 610 shown in FIG. 7 is created by partially eliminating the introductory statement 802.

In addition, it is possible to operate a button "return" 611 or a button "proceed" 612 of the browser so as to return or proceed through the browsing history.

Here, if the combination of the keyword and link information is useful for the user, the user may browse the content displayed in the content display area 603. If it is useless for the user, the user may stop browsing the content soon and operate the browser button "return" 611 or the link "return" 804 to display the search results as shown in FIG. 7 in the content display area 603 again.

In addition, discussion is made on the case in which the link information refers to the product introductory content introducing a product and the product introductory content associated with the link information is displayed in the content display area 603 as shown in FIG. 7. The combination of the keyword and link information is presumably useful if the user selects the link information for purchasing the product. The combination of the keyword and link information is presumably useless if the user selects the link information for returning to the display of search results.

Then, a configuration to identify the action of the user after the terminal device 14 executes the add-on or plug-in of the browser, the user selects link information contained in the search results, and the content associated with the link information is displayed is installed.

Among the actions of the user, the first kind of action is an action that implies that the combination of the keyword and link information is inappropriate such as the following:

(a) the browser button "return" 611 is operated within a given time period, for example within several seconds, after the content is displayed;

(b) the browser button "return" 611 is operated with no selection being made on the link information in the content after the content is displayed; and (c) of the link information provided in the content, the user selects the link "return" 804 for returning to the search results after the content is displayed.

Among the actions of the user, the second kind of action is an action that implies that the combination of the keyword and link information is appropriate such as the following:

(p) the content is browsed for a given or more time period since it is displayed. The user has presumably read the content well; and (q) of the link information provided in the content, the user selects link information from which it is anticipated that the user has interest in the content, such as the purchase button 803 for a product regarding the content, after the content is displayed.

The first kind of action is called "evasive action" and the second kind of action is called "attracted action" hereafter for easier understanding.

On the basis of the above, the terminal device 14 notifies the information provisioning device 12 of the identified action.

In addition, if the information provisioning device 12 also functions as a web server providing the product introductory contents, the above actions (c) and (q) can be identified by analyzing the type of content request from the terminal device 14.

Here, as the evasive action and attracted action, any of the above actions (a) to (c) and actions (p) and (q) can be selected as appropriate or any other actions can be added as appropriate.

Then, it is determined whether the keyword should be a taboo character string for the link information with reference to the numbers of times of evasive actions or numbers of times of attracted actions.

Then, if the keyword should be a taboo character string, the keyword is designated as a taboo character string for the link information; otherwise, the keyword is not designated as a taboo character string for the link information.

A keyword is designated as a taboo character string for link information in the following cases:

(a) the ratio of evasive actions for a given number of times of most recent browsing of the content associated with the link information is equal to or higher than a threshold;

(b) the value resulting from subtracting the number of times of attracted actions from the number of times of evasive actions among a given number of times of most recent browsing of the content associated with the link information is equal to or higher than a threshold;

(c) the ratio of the number of times of evasive actions to the number of times of attracted actions among a given number of times of most recent browsing of the content associated with the link information is equal to or higher than a threshold; and (d) in the above (a), (b), and (c), the expression "a given number of times of most recent browsing of the content" is replaced with the expression "a given number of times of browsing after the content is released or updated." In other words, immediately after the content is released or updated, all taboo character strings for the link information are cancelled and taboo character strings for the link information are set based on how the user acts after the release or update.

One of the above cases can be used or the above cases can be used in combination.

Another scheme of determining whether the keyword is a taboo character string consists of successively detecting the action of the user, setting a taboo parameter for a combination of each keyword and link information dynamically, and determining whether the taboo parameter satisfies a given condition.

In the above scheme, first, a taboo parameter p is given an appropriate positive constant as an initial value Q. The taboo parameter is updated using constants A, B, and K satisfying $0<A<1<B$ and $0<K<1$. The update is conducted as follows.

First, each time the keyword of interest is searched for, the weighted average of the initial value Q and taboo parameter p is obtained and the result is used to update the taboo parameter.

$$p \leftarrow K \times p + (1-K) \times Q$$

In the above, the symbol "←" means substitution. With this process, the evasion parameter p approaches the initial value Q.

Furthermore, if an evasive action is detected after the search, the taboo parameter is multiplied by B.

$$p \leftarrow B \times p$$

With the above process, the evasion parameter p is increased.

On the other hand, if an attracted action is detected after the search, the taboo parameter is multiplied by A.

$$p \leftarrow A \times p$$

With the above process, the evasion parameter p is decreased.

Then, while the taboo parameter exceeds a constant R greater than a given initial value Q, the keyword is designated as a taboo character string for the link information; otherwise, the keyword is undesignated as a taboo character string for the link information.

For easier understanding, explanation will be made using numeric values: A=0.5, B=1.2, K=0.7, Q=1.0, and R=1.1. First, the initial value of the evasion parameter p is:

$$p \leftarrow 1.0$$

Then, it is assumed that the user took an evasive action after the search with the keyword of interest.

Then, the weighted average of the current value, 1.0, and initial value Q=1.0 of the evasion parameter p is calculated.

$$p \leftarrow 0.7 \times 1.0 + 0.3 \times 1.0 = 1.0$$

Furthermore, the evasion parameter p is multiplied by B=1.2.

$$p \leftarrow 1.2 \times 1.0 = 1.2$$

Then, the evasion parameter p is greater than a constant R=1.1. Therefore, the keyword is designated as a taboo character string for the link information. From then on, the link information is removed from the search results of search with the keyword, or ranked lower. Then, it is less likely that the user will take an evasive action or attracted action on the content of the link information.

However, as the search for the keyword is simply repeated, the evasion parameter p changes as follows.

$$p \leftarrow 0.7 \times 1.2 + 0.3 \times 1.0 = 1.14;$$

$$p \leftarrow 0.7 \times 1.14 + 0.3 \times 1.0 = 1.098$$

As seen from the above, even after the keyword is designated as a taboo character string, the evasion parameter p gradually approaches 1 each time the keyword is searched for. Then, the evasion parameter p eventually becomes equal to or lower than a constant R even if the user takes no action on the content regarding the link information.

Then, the keyword is undesignated as a taboo character string for the link information. From then on, the link information is contained in the search results of search with the keyword.

If the user takes an attracted action after the above search, the evasion parameter p is multiplied by A=0.5.

$$p \leftarrow 0.5 \times 1.098 = 0.549$$

This is lower than a constant R; the keyword is not designated as a taboo character string for the link information.

If the user takes an attracted action upon further search, the evasion parameter is calculated as follows, and becomes lower than a constant R and initial value Q:

$$p \leftarrow 0.7 \times 0.549 + 0.3 \times 1.0 = 0.6843;$$

$$p \leftarrow 0.5 \times 0.6843 = 0.34215$$

Subsequently, if the user takes an evasive action upon further search, the evasion parameter p is calculated as follows, and is increased:

$$p \leftarrow 0.7 \times 0.34215 + 0.3 \times 1.0 = 0.539505;$$

$$p \leftarrow 1.2 \times 0.539505 = 0.647406$$

If search and an evasive action are further repeated subsequently, as in the above, the evasion parameter p will gradually be increased and exceed a constant R at some point and the keyword is designated as a taboo string for the content.

After several times of subsequent search, the evasion parameter p gradually approaches an initial value Q and becomes lower than a constant R, whereby the taboo character string is cancelled.

On the other hand, if search and an attracted action are repeated, the evasion parameter p continues to go down. Even if the user conducts a wrong operation that leads to search and an evasive action, the evasion parameter p does not immediately exceed a constant R.

As described above, a keyword can be designated and undesignated as a taboo character string dynamically by changing the evasion parameter p based on the action of the user.

Alternatively, the taboo character string can be set based on the details of the content regardless of the action of the user.

A first scheme consists of extracting words antonymous to each other from the words contained in the content, comparing them in the number of times of appearance, and designating the one that appears less often as a taboo character string.

For example, if a word "simple" appears one time and a word "luxurious" appears ten times in a product introductory content, the word "simple" is designated as a taboo character string.

Making reference to a thesaurus of language describing the content, the information provisioning device 12 can automatically extract words antonymous to each other and compare them in the number of times of appearance.

A second scheme designates as a taboo character string a word situated next to a forbidden character string already designated by the administrator or by the above scheme with a given delimiter (for example, a comma, pause mark, parenthesis, etc.) in-between within the content regarding link information.

For example, if words "simple, plain" and words "luxurious, flamboyant" appear in a content and the word "simple" is already designated as a taboo character string, the word "plain" is also designated as a taboo character string.

In the above schemes, automatic designation of taboo character strings results in significantly reducing the supervision workload of the administrator of the information provisioning device 12 and enabling appropriate supervision of taboo character strings.

This application claims the priority over Japanese Patent Application No. 2010-185371, filed on Aug. 20, 2010, the entire disclosure of which is incorporated by reference herein to the extent that the national law of the designated nation allows.

INDUSTRIAL APPLICABILITY

The present invention can provide an information provisioning device, information provisioning method, program, and information recording medium suitable for presenting more appropriate search results to the user while using an existing search function.

DESCRIPTION OF REFERENCE NUMERALS

11 Information provisioning system
12 Information provisioning device
14 Terminal device
16 Internet
18 Information search device
101 Computer
102 CPU
103 Hard disc
104 RAM
105 NIC
106 Input device
107 Display device
201 Query reception part
202 Acquisition part
203 Correction part
204 Presentation part
205 Search part
206 Storage part
207 Selection reception part
601 Screen
602 URL input field
603 Content display area
604 Query input field
605 Search tool bar
606 Query input field
607 Search results display field
608 Matched information
609 Identification information
610 Snippet
801 Product image
802 Introductory statement
803 Purchase button

The invention claimed is:
1. An information provisioning device, comprising:
a query reception part configured to receive a query;

a storage part configured to store taboo character strings in association with a plurality of identification information representing a plurality of search targets respectively;

an acquisition part configured to acquire a search result containing identification information of search targets satisfying said query;

a correction part configured to correct said acquired search result;

a presentation part configured to present identification information contained in said corrected search result; and a selection reception part configured to receive a selection command on said presented information, wherein said storage part configured to store identification information contained in matched information constituting said acquired search result as identification information already searched, and identification information contained in matched information selected with said selection command as identification information already selected; and wherein, for each identification information contained in said acquired search result, said correction part is further configured to obtain taboo character strings stored in the storage part in association with said each identification information, determine whether said query contains at least one of the obtained taboo character strings, and correct identification information, if the identification information is associated with the at least one of the obtained taboo character strings determined to be contained in said query, by a least one of removing and lowering the rank of the search target, represented by the identification information, from among the plurality of search targets.

2. The information provisioning device according to claim 1, wherein:

said correction part is further configured to correct said acquired search result when identification information contained in said matched information is stored in said storage part as one of those already searched, and the identification information contained in said matched information is not stored in said storage part as one of those already selected.

3. The information provisioning device according to claim 1, wherein:

said acquisition part makes an external information search device search for a search target based on said query and acquires said search results.

4. The information provisioning device according to claim 1, comprising:

a search part searching for a search target based on said query, wherein said acquisition part acquires the search results found by said search part.

5. The information provisioning device according to claim 1, wherein:

said matched information further contains the rank of the found search target; and said correction part corrects said search results by changing the rank of matched information contained in said search results.

6. The information provisioning device according to claim 1, wherein:

said correction part corrects said search results by narrowing down matched information contained in the search results.

7. The information provisioning device according to claim 1, wherein:

said storage part further stores, for each user, queries that result in storing the identification information as one of those already searched or already selected; and for each query and identification information, the character string of the query is stored in said storage part as a taboo character string for the identification information when the number of users for whom the identification information is stored in said storage part as one of those already searched due to the query and the number of users for whom the identification information is stored in said storage part as one of those already selected due to the query satisfying a given set condition.

8. The information provisioning device according to claim 1, wherein:

said matched information further contains a snippet of the search target; and said correction part further corrects said search results in regard to each piece of matched information contained in said search results based on the character string obtained by removing the character string contained in said query from the character string of the snippet contained in the matched information.

9. An information provisioning method executed by an information provisioning device comprising a query reception part, a storage part, an acquisition part, a correction part, a presentation part, and a selection reception part, wherein:

said storage part stores taboo character strings in association with a plurality of identification information representing a plurality of search targets respectively; and said method comprises:

a query reception step in which said query reception part receives a query;

an acquisition step in which said acquisition part acquires a search result containing identification information of search targets satisfying said query;

a correction step in which said correction part corrects said query search result;

a presentation step in which said presentation part presents identification information contained in said corrected search result; and a selection reception step in which said selection reception part receives a selection command on said presented information, wherein said storage part stores identification information contained in matched information constituting said acquired search result as identification information already searched, and identification information contained in matched information selected with said selection command as identification information already selected; and wherein, for each identification information contained in said acquired search result, said correction part obtains taboo character strings stored in the storage part in association with said each identification information, determines whether said query contains at least one of the obtained taboo character strings, and corrects identification information, if the identification information is associated with the at least one of the obtained taboo character strings determined to be contained in said query, by at least one of removing and lowering the rank of the search target, represented by the identification information, from among the plurality of search targets.

10. An information provisioning device, comprising:

a query reception part configured to receive a query;

a storage part configured to store taboo character strings in association with a plurality of identification information representing a plurality of search targets respectively;

an acquisition part configured to acquire a search result containing identification information of search targets satisfying said query;

a correction part configured to correct said acquired search result; and a presentation part configured to present identification information contained in said corrected search result, wherein, for each identification information contained in said acquired search result, said correction part is further configured to obtain taboo character strings stored in the storage part in association with said each identification information, determine whether said received query contains at least one of the obtained taboo character strings, and correct identification information, if the identification information is associated with the at least one of the obtained taboo character strings determined to be contained in said query, by at least one of removing and lowering the rank of the search target, represented by the identification information, from among the plurality of search targets.

* * * * *